United States Patent
Yeo et al.

(10) Patent No.: US 8,890,801 B2
(45) Date of Patent: Nov. 18, 2014

(54) ELECTROPHORESIS DISPLAY DEVICE AND DRIVING METHOD

(75) Inventors: JunHo Yeo, Chilgok-gun (KR); DaeSung Jung, Gumi-si (KR); Gayoung Lee, Ulsan (KR)

(73) Assignee: LG Display Co., Ltd., Seoul (KR)

( * ) Notice: Subject to any disclaimer, the term of this patent is extended or adjusted under 35 U.S.C. 154(b) by 249 days.

(21) Appl. No.: 13/443,590

(22) Filed: Apr. 10, 2012

(65) Prior Publication Data

US 2013/0009931 A1    Jan. 10, 2013

(30) Foreign Application Priority Data

Jul. 5, 2011   (KR) ................. 10-2011-0066475

(51) Int. Cl.
- *G09G 3/34* (2006.01)
- *G09G 3/20* (2006.01)
- *G06F 3/038* (2013.01)
- *G02B 26/00* (2006.01)
- *G02F 1/167* (2006.01)

(52) U.S. Cl.
CPC ............ *G09G 3/344* (2013.01); *G09G 2300/08* (2013.01); *G02F 2202/22* (2013.01); *G02F 1/167* (2013.01); *G09G 2330/04* (2013.01)
USPC .............. 345/107; 345/55; 345/211; 359/296

(58) Field of Classification Search
CPC .. G02F 1/136204; G09F 3/344; G09F 3/3433
USPC ....................... 345/55, 84, 107, 211; 359/296
See application file for complete search history.

(56) References Cited

U.S. PATENT DOCUMENTS

| | | |
|---|---|---|
| 2003/0020845 A1 | 1/2003 | Lee et al. |
| 2005/0219432 A1* | 10/2005 | Na et al. ................. 349/40 |
| 2008/0143640 A1* | 6/2008 | Hsu et al. ................ 345/55 |

FOREIGN PATENT DOCUMENTS

| | | |
|---|---|---|
| CN | 1396656 A | 2/2003 |
| CN | 101192379 A | 6/2008 |

* cited by examiner

*Primary Examiner* — Lun-Yi Lao
*Assistant Examiner* — Jarurat Suteerawongsa
(74) *Attorney, Agent, or Firm* — Birch, Stewart, Kolasch & Birch, LLP

(57) ABSTRACT

Discussed is an electrophoresis display device. The electrophoresis display device includes a plurality of gate lines and data lines formed to intersect each other, a gate driving circuit supplying a scan pulse to the gate lines, a data driving circuit respectively supplying a plurality of data voltages to the data lines, a plurality of first ESD circuits respectively connected to one sides of the gate lines, a plurality of second ESD circuits respectively connected to the other sides of the gate lines, and a plurality of third ESD circuits respectively connected to the data lines. First terminals of the first ESD circuits are respectively connected to the gate lines, and second terminals of the first ESD circuits are connected to a gate low voltage (VGL) terminal of the gate driving circuit.

9 Claims, 6 Drawing Sheets

FIG.7

| Consumption Current In Idle Period ||||
|---|---|---|---|
| Division | The Related Art | The Present Invention | Reduction In Consumption Current |
| Text Pattern | 9.9[uAh] | 1.1[uAh] | 11.1% |
| Max Pattern | 12.3[uAh] | 1.0[uAh] | 8.1% |
| 4 Grayscale Pattern | 10.7[uAh] | 1.0[uAh] | 9.3% |

# ELECTROPHORESIS DISPLAY DEVICE AND DRIVING METHOD

CROSS-REFERENCE TO RELATED APPLICATIONS

This application claims the priority benefit of the Korean Patent Application No. 10-2011-0066475 filed on Jul. 5, 2011, which is hereby incorporated by reference as if fully set forth herein.

BACKGROUND

1. Field of the Invention

The present invention relates to an electrophoresis display device, and more particularly, to an electrophoresis display device and a driving method thereof, which decrease a leakage current during an idle period and thus reduce consumption power.

2. Discussion of the Related Art

Electrophoresis display devices denote devices that display an image with electrophoresis in which colored charged particles move by an electric field given from the outside. Herein, electrophoresis denotes that when an electric field is applied to e-ink where charged particles are dispersed into liquid, the charged particles moves inside the liquid by Coulomb force.

When materials with electric charges are placed in an electric field, the materials perform unique movement according to the sizes and shapes of molecules and electric charges. Materials being separated by a moving difference between materials are called electrophoresis.

Electrophoresis display devices using electrophoresis have bistability, and thus can maintain a displayed image for a long time even when an applied voltage is removed. That is, since electrophoresis display devices maintain a constant screen for a long time even when a voltage is not continuously applied thereto, the electrophoresis display devices are display devices suitable for an e-book field that does not require the quick change of a screen.

Moreover, electrophoresis display devices are not dependent on a viewing angle unlike liquid crystal displays (LCDs), and moreover, provide an image comfortable for eyes similarly to papers. Furthermore, electrophoresis display devices have flexibility, low power consumption, and eco like. Accordingly, the demand of electrophoresis display devices is increasing.

FIG. 1 is a diagram illustrating an electrophoresis display device of the related art. FIG. 2 is a diagram illustrating a driving method of an electrophoresis display device of the related art.

Referring to FIGS. 1 and 2, the related art electrophoresis display device (EPD) includes a plurality of gate lines (scan lines) 10, a plurality of data lines 20 that intersect the gate lines 10, a plurality of electrostatic discharge (ESD) circuits 60, an electrophoresis film (not shown), and a plurality of driving circuits (not shown). Each of the driving circuits includes a data driving circuit, a gate driving circuit, and a controller.

The data driving circuit generates data voltages corresponding to image data and respectively supplies the data voltages to the data lines 20. Herein, each of the data voltages is generated as a positive voltage or a negative voltage according to the grayscale level of corresponding image data.

The gate driving circuit generates a gate pulse (scan pulse) that swings between a gate high voltage (VGH) and a gate low voltage (VGL), and sequentially supplies the gate pulse to the gate lines 10.

The controller controls the data driving circuit and the gate driving circuit.

An LCD supplies image data to a liquid crystal panel thereof in units of a frame to display an image, causing large power consumption. However, an EPD supplies image data to a display panel thereof to convert an image and then maintains display, without requiring separate power.

Such an EPD, as shown in FIG. 2, is driven in three stages such as a power-on period, an update period, and an idle period, thereby displaying an image. Also, in the EPD, a screen conversion is performed from a previous screen to a screen next thereto.

The power-on period is a period where an EPD is being turned on for displaying an image.

The update period is a period where the image data of a display panel are updated for a conversion from a previous screen to a screen next thereto.

The idle period is a period that stabilizes image data supplied to the display panel, and specifically is a system stabilization period for maintaining the display of an image for a certain time.

For a conversion from a previous screen to a screen next thereto, the EPD supplies waveforms to a plurality of pixels in the display panel, respectively. Herein, in the EPD, a screen conversion is not fast due to the characteristic of bistability, and thus, by supplying a waveform that is the sequence of image data for a screen conversion, a conversion is performed from a previous screen to a screen next thereto.

In this case, new data are respectively written in the pixels through a data update operation that is performed for about 1 second, and then current data are maintained until being updated to next data.

In this way, the EPD stabilizes an image by maintaining the idle period for a certain time after the update of the image data, and even when the idle period is ended and then power is not supplied to the display panel, the EPD maintains the display of the image for a long time.

In such an EPD, a plurality of ESD circuits 60 are applied to respective start portions of the data lines 20, for preventing damage due to static electricity that is generated in the display panel. Also, a plurality of ESD circuits 60 are applied to respective start portions of the gate lines 10, and a plurality of ESD circuits 60 are applied to respective end portions of the gate lines 10.

When external static electricity is applied to the display panel, the ESD circuits 60 discharge the external static electricity. The ESD circuits 60 are provided into the display panel, for protecting a plurality of active areas of the display panel from the external static electricity.

One side of each of the ESD circuits 60 is connected to a corresponding gate line 10 or a corresponding data line 20, and the other side of each ESD circuit 60 is connected to a ground (GND) 40. The gate lines 10 and the data lines 20 are connected to the ground 40 through the respective ESD circuits 60.

In the EPD, after the power-on period and the update period, a stabilization voltage of −20[V] is supplied to the gate lines 10 for a certain time for stabilization of an image during the idle period.

At this point, as illustrated in FIG. 1, a current path is formed by an electric potential difference between a ground voltage and a stabilization voltage of −20[V] that are supplied to each of the gate lines 10. When a current path is formed on each of the gate lines 10 and data lines 20 connected to the ground GND, a leakage current 70 is generated.

A source voltage VCC is powered off during the idle period, and thus, consumption power is required to be reduced. On the contrary, consumption power is increased by the leakage current 70 due to the stabilization voltage of −20[V] that is supplied to the gate lines 10 for stabilization of an image during the idle period.

SUMMARY

Accordingly, the present invention is directed to provide an electrophoresis display device and a driving method thereof that substantially obviate one or more problems due to limitations and disadvantages of the related art.

An aspect of the present invention is directed to provide an electrophoresis display device and a driving method thereof, which reduce a leakage current due to a stabilization voltage that is supplied to a plurality of gate lines for stabilization of an image during an idle period, thus decreasing consumption power.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an electrophoresis display device, which includes a plurality of electrophoresis cells, including: a plurality of gate lines and data lines formed to intersect each other; a gate driving circuit supplying a scan pulse to the gate lines; a data driving circuit supplying a plurality of data voltages to the data lines, respectively; a plurality of first ESD circuits connected to one sides of the gate lines, respectively; a plurality of second ESD circuits connected to the other sides of the gate lines, respectively; and a plurality of third ESD circuits respectively connected to the data lines, wherein first terminals of the first ESD circuits are respectively connected to the gate lines, and second terminals of the first ESD circuits are connected to a gate low voltage (VGL) terminal of the gate driving circuit.

In another aspect of the present invention, there is provided a driving method of an electrophoresis display device, which includes: a plurality of gate lines and data lines formed to intersect each other; a gate driving circuit supplying a scan pulse to the gate lines; a data driving circuit supplying a plurality of data voltages to the data lines, respectively; a plurality of first ESD circuits connected to one sides of the gate lines, respectively; a plurality of second ESD circuits connected to the other sides of the gate lines, respectively; and a plurality of third ESD circuits respectively connected to the data lines, including: supplying a gate high voltage to the gate lines, and respectively supplying the data voltages to the data lines, in a data update period; and supplying a stabilization voltage for stabilizing an image to the gate lines, and supplying a ground voltage to the data lines, in an idle period, wherein first terminals of the first ESD circuits are respectively connected to the gate lines, and second terminals of the first ESD circuits are connected to a gate low voltage (VGL) terminal of the gate driving circuit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 7 is a diagram showing an example of effects in which consumption current is reduced by the electrophoresis display device and a driving method thereof according to an embodiment of the present invention.

DETAILED DESCRIPTION OF THE INVENTION

Figure 1:
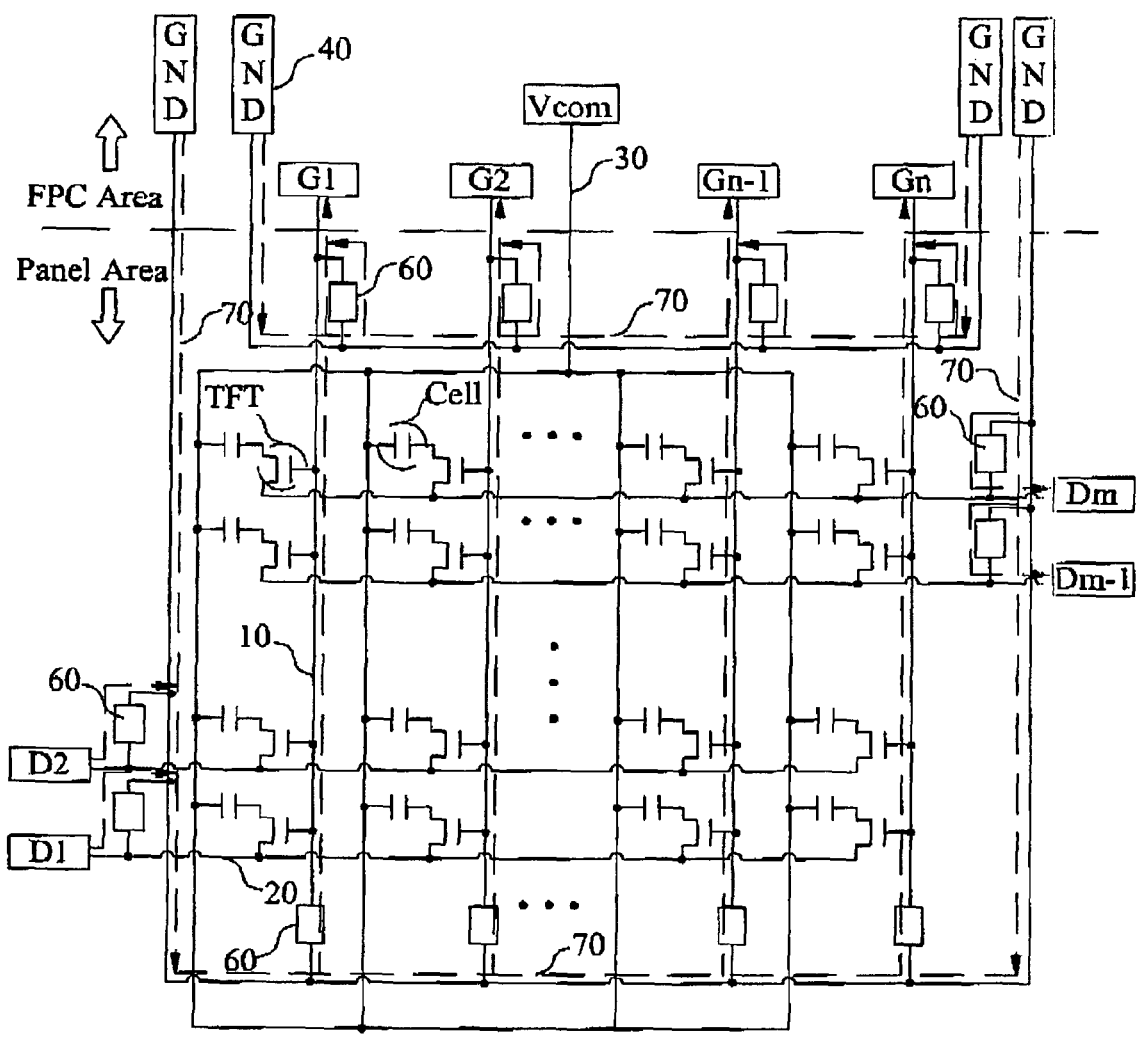
FIG. 1 is a diagram illustrating an electrophoresis display device of the related art.
Figure 2:
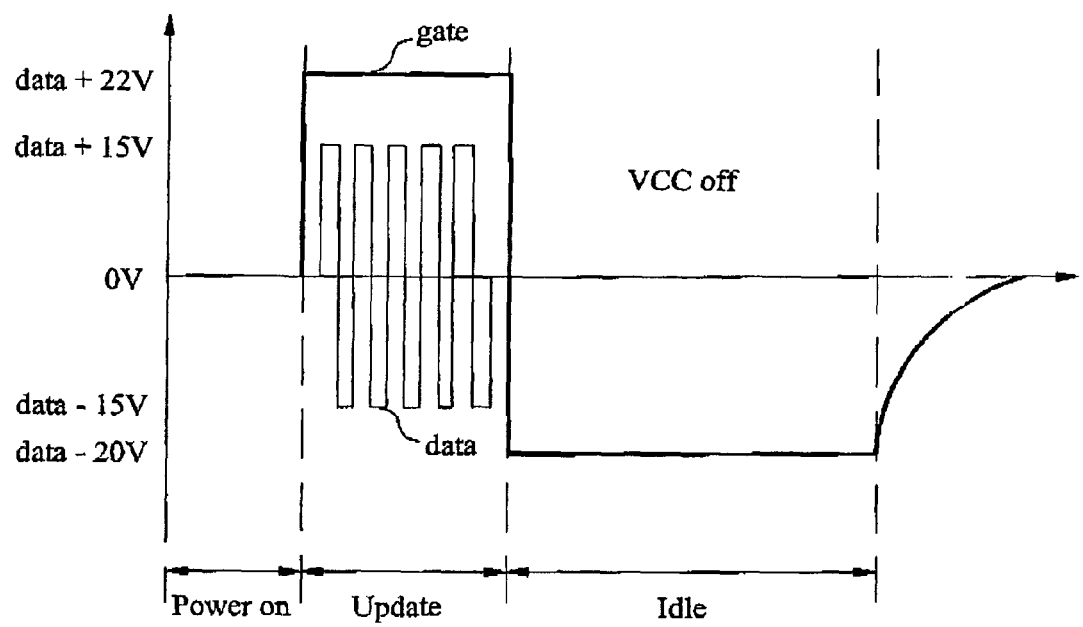
FIG. 2 is a diagram illustrating a driving method of an electrophoresis display device of the related art.

Hereinafter, an electrophoresis display device and a driving method thereof according to an embodiment of the present invention will be described in detail with reference to the accompanying drawings. Like reference numerals refer to like elements throughout. In the below description, elements and functions that are irrelevant to the essentials of the present invention and have been known to those skilled in the art may not be provided.

Figure 3:
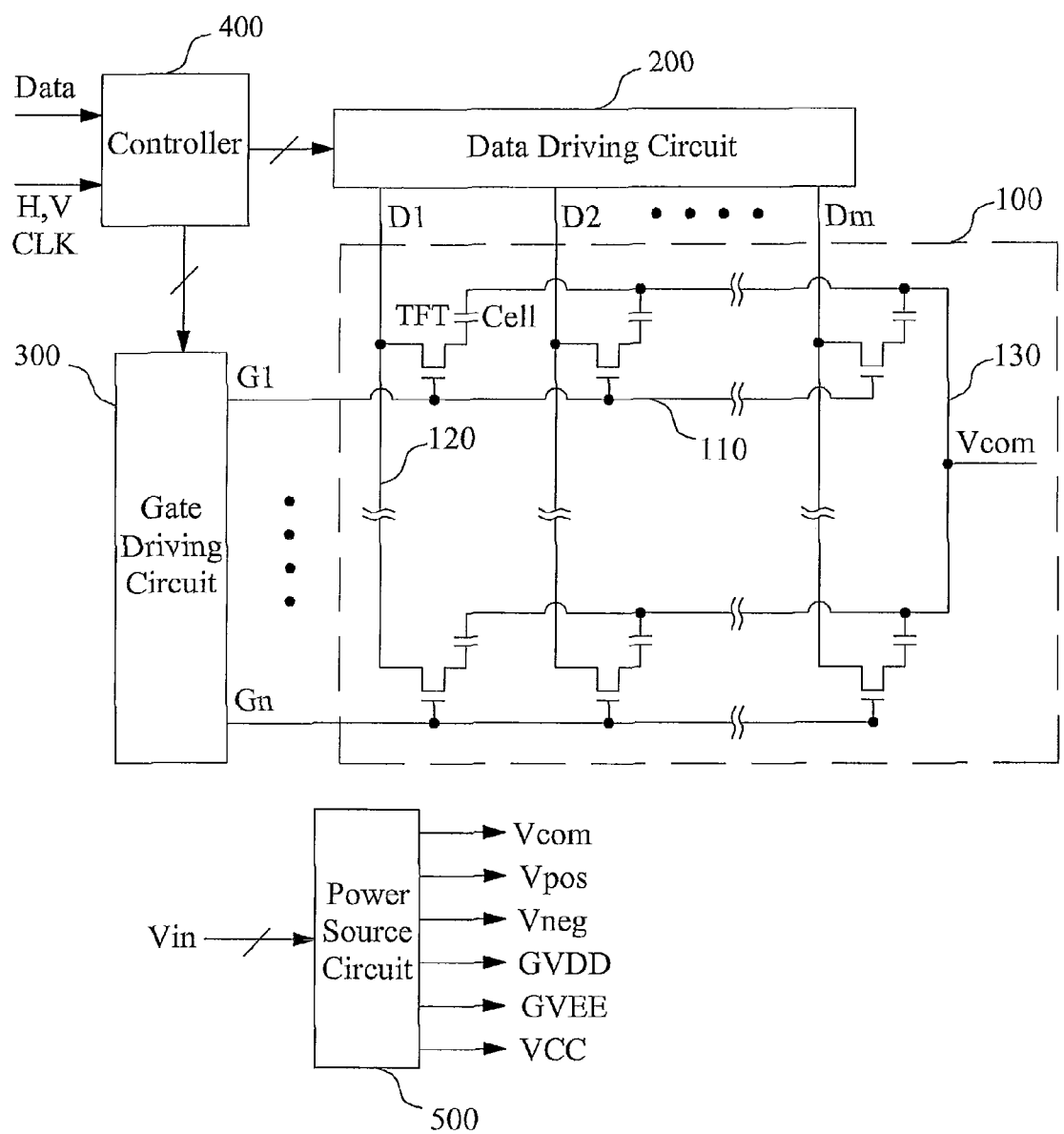
FIG. 3 is a block diagram illustrating an electrophoresis display device according to an embodiment of the present invention.
Figure 4:
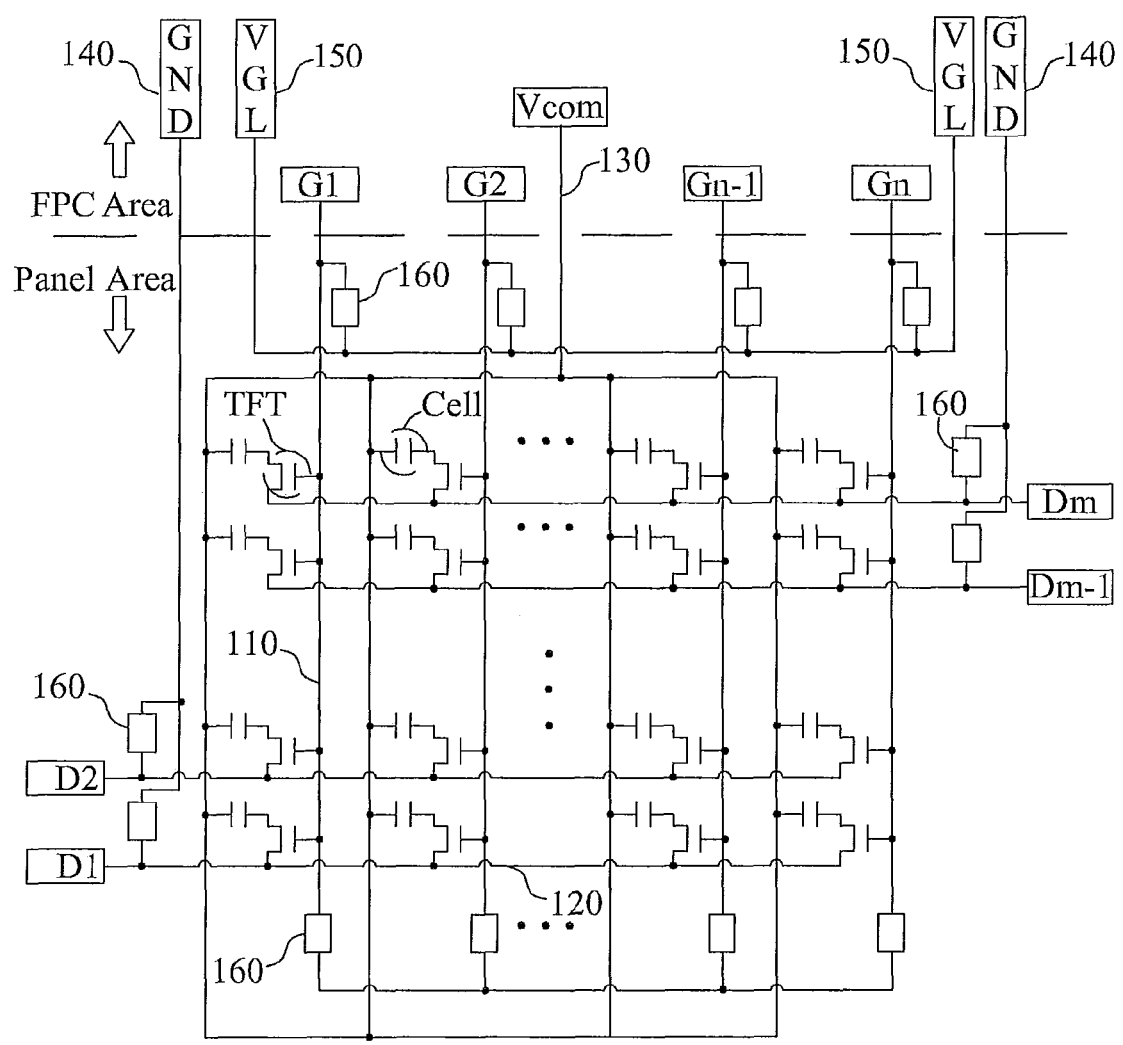
FIG. 4 is a diagram illustrating a display panel of FIG. 3.

FIG. 3 is a block diagram illustrating an electrophoresis display device according to an embodiment of the present invention. FIG. 4 is a diagram illustrating a display panel of FIG. 3.

Referring to FIGS. 3 and 4, the electrophoresis display device according to an embodiment of the present invention includes a display panel 100, a data driving circuit 200, a gate driving circuit 300, a controller 400, and a power source circuit 500.

In the display panel 100, n number of gate lines 110 and m number of data lines 120 are formed to intersect each other. m×n number of pixels (Cell) are formed in a matrix type by intersection between the date lines 120 and the gate lines 110. A thin film transistor TFT is formed in each of the pixels, and transfers image data to a corresponding pixel.

Moreover, the display panel 100 includes a common voltage line 130, a plurality of ESD circuits 160, and an electrophoresis layer.

Figure 5:
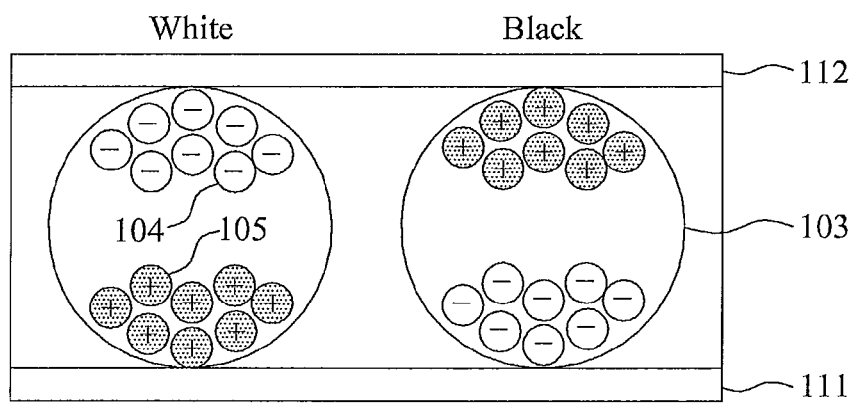
FIG. 5 is a diagram illustrating in detail a microcapsule pixel structure of the electrophoresis display device according to an embodiment of the present invention.
Figure 6:
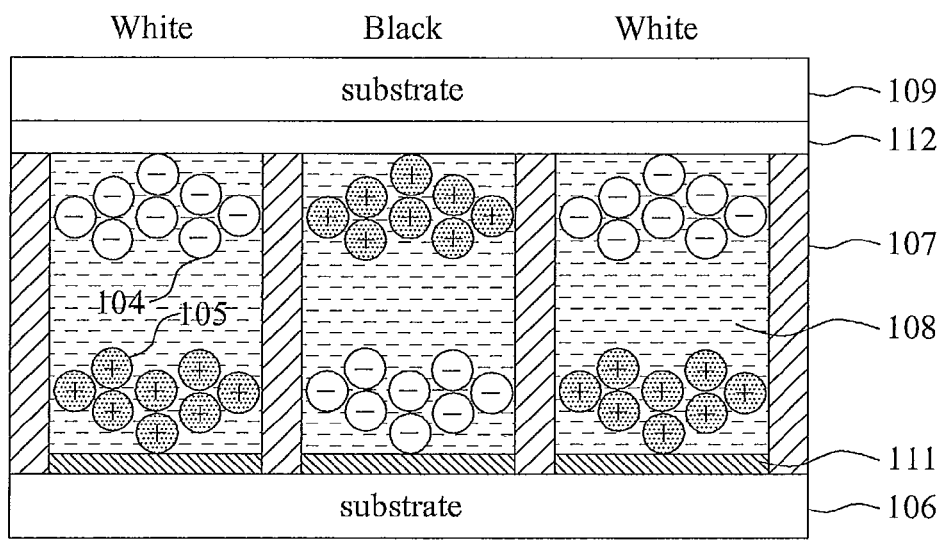
FIG. 6 is a diagram illustrating in detail a micro-cup pixel structure of the electrophoresis display device according to an embodiment of the present invention.

FIG. 5 is a diagram illustrating in detail a microcapsule pixel structure of the electrophoresis display device according to an embodiment of the present invention. FIG. 6 is a diagram illustrating in detail a micro-cup pixel structure of the electrophoresis display device according to an embodiment of the present invention.

Referring to FIG. 5, each pixel formed in the display panel 100 includes a pixel electrode 111 and a common electrode 112, and the electrophoresis layer is formed between the pixel electrode 111 and the common electrode 112. In FIG. 5, an electrophoresis film including a plurality of microcapsules 103 is applied as the electrophoresis layer.

Herein, when the electrophoresis display device displays a black-and-white image, each of the microcapsules 103 includes a plurality of white-colored charged particles 104 and a plurality of black-colored charged particles 105. Also, each microcapsule 103 includes a solvent in order for the white charged particles 104 and the black charged particles 105 to move by electrophoresis.

In this case, the white charged particles 104 may be electrically charged to a negative polarity (−), and the black charged particles 105 may be electrically charged to a positive polarity (+). On the contrary, the white charged particles 104 may be electrically charged to a positive polarity (+), and the black charged particles 105 may be electrically charged to a negative polarity (−).

The white charged particles 104 and the black charged particles 105 move upward and downward in a solvent by electrophoresis, according to an electric field formed in a pixel. The white charged particles 104 reflect external light, or the black charged particles 105 absorb the external light, thereby displaying an image.

As illustrated in FIG. 6, the electrophoresis layer may be formed in a micro-cup structure.

Referring to FIG. 6, a plurality of pixel electrodes 111 are formed on the lower substrate 106. A plurality of partition walls 107 are formed to surround each of the pixel electrodes 111, thereby defining a filling space. Herein, the partition walls 107 may be formed of a non-polar organic material or a non-polar inorganic material.

The electrophoresis layer may be formed by filling a display solvent (which includes the white charged particles 104, the black charged particles 105, and the solvent 108) into the filling space that is defined by the partition walls 107.

A common electrode 112 for supplying a common voltage Vcom to all the pixels (Cell) is formed at an upper substrate 109 of the display panel 100.

In FIGS. 5 and 6, the common electrode 112 is disposed at a portion that displays an image, and thus formed as a transparent electrode. The common electrode 112, for example, may be formed of indium tin oxide (ITO).

Each pixel electrode 111 is disposed on the reverse of a portion that displays an image, and thus needs not necessarily be formed of a transparent material. The pixel electrodes 111 may be formed of ITO or an opaque metal.

Each of the lower substrate 106 and upper substrate 109 of the display panel 100 may be formed as a glass substrate, a metal substrate, a flexible plastic substrate or the like.

The data lines 120 and the gate lines 110 are formed at the lower substrate 106, and a plurality of thin film transistors TFT are respectively formed in a plurality of pixel areas that are defined by intersection between the data lines 120 and the gate lines 110.

A gate electrode of each of the thin film transistors TFT is connected to a corresponding gate line 110, a source electrode of each thin film transistor TFT is connected to a corresponding data line 120, and a drain electrode of each thin film transistor TFT is connected to a corresponding pixel electrode 111.

The thin film transistors TFT are turned on and select pixels (Cell) formed on a line for displaying an image, according to a scan pulse from a corresponding gate line 110. The thin film transistors TFT supply respective data voltages, applied from the date lines 120, to the pixel electrodes 111 of the pixels (Cell) that are turned on by the scan signal.

When a positive voltage Vpos is applied to a pixel electrode 111 of a pixel (Cell), the white charged particles 104 electrically charged to a negative polarity (−) move to a lower portion of the pixel, namely, move to the pixel electrode 111.

However, the black charged particles 105 electrically charged to a positive polarity (+) move to an upper portion of the pixel, namely, move to the common electrode 112. Accordingly, the black charged particles 105 absorb light inputted from outside the pixel (Cell), thereby displaying a black image.

When a negative voltage Vneg is applied to a pixel electrode 111 of a pixel (Cell), the black charged particles 105 in the pixel (Cell) move to a lower portion of the pixel, but the white charged particles 104 move to an upper portion of the pixel.

Therefore, the white charged particles 104 reflect light inputted from outside the pixel (Cell), thereby displaying only a white screen.

New image data are respectively written in the pixels (Cell) through a data update operation that updates image data with waveforms. After updating the image data, the pixels (Cell) maintain the respective grayscale levels of currently-written image data until the written image data are respectively updated to next image data.

When the electrophoresis display device is a device that displays a color image, a plurality of color filters for respectively converting light into red light, green light, and blue light may be formed at the upper substrate 109. Also, charged particles in the electrophoresis layer are colored in red, green, and blue, thereby displaying a color image.

Referring again to FIG. 3, the controller 400 generates a data control signal and a gate control signal on the basis of a horizontal sync signal H, a vertical sync signal H, a clock signal CLK, and image data (data) that are inputted from the outside. The data control signal is supplied to the data driving circuit 200, and the gate control signal is supplied to the gate driving circuit 300.

The data control signal includes a source timing control signal for controlling the operation timing of the data driving circuit 200. The gate control signal includes a gate timing control signal for controlling the operation timing of the gate driving circuit 300.

The controller 400 supplies predetermined digital images by grayscale level to the data driving circuit 200 according to the current grayscale level of a pixel and the next grayscale level of a pixel to be updated, by using a frame memory that stores an input image and a lookup table in which data voltage waveforms are set.

Herein, the controller 400 converts image data for several tens of frames into sequence type of image data to generate waveforms, for conversion from a previous screen to a screen next thereto. Subsequently, the controller 400 supplies image data for the next screen to the data driving circuit 200 with the waveforms.

The data driving circuit 200 generates data voltages on the basis of image data based on the waveforms that are supplied from the controller 400. Subsequently, the data driving circuit 200 supplies the data voltages to the data lines 120 of the display panel 100, respectively.

Specifically, during an image data update period, the data driving circuit 200 generates data voltages and supplies the data voltages to the display panel 100, according to the image data inputted from the controller 400.

The data driving circuit 200 may select any one of three phase voltages Vpos, Vneg and Vss as a data voltage and respectively output the selected data voltages to the data lines 120, in response to the digital data that are inputted from the controller 400 in an operation of updating image. In this case, the data voltage is generated as a positive (+) data voltage, a negative (−) data voltage, or a ground voltage Vss.

As an example, during the image data update period, when the digital data inputted from the controller 400 is '00', the data driving circuit 200 outputs a positive data voltage Vpos of +15[V] as a data voltage.

During the image data update period, when the digital data inputted from the controller 400 is '01', the data driving circuit 200 outputs a negative data voltage Vneg of −15[V] as a data voltage.

Moreover, during the image data update period, when the digital data inputted from the controller 400 is '10' or '11', the data driving circuit 200 may output a ground voltage Vss of 0 V as a data voltage.

Each of the data voltages Vpos, Vneg and Vss outputted from the data driving circuit 200 is supplied to a pixel electrode 111 of a pixel (Cell) via a data line 120 and a thin film transistor connected thereto.

The gate driving circuit 300 generates a scan pulse and supplies the scan pulse to the gate lines 110 of the display panel 100, according to the gate control signal supplied from the controller 400.

During the image data update period, the gate driving circuit 300 sequentially outputs the scan pulses that are respectively synchronized with the data voltages supplied from the data lines 120.

In this case, each of the scan pulses is outputted to have a positive (+) gate high voltage (VGH) and a negative gate low voltage (VGL). Herein, the scan pulse swings between the gate high voltage (VGH) and the gate low voltage (VGL). As an example, the gate high voltage (VGH) may be supplied as a voltage of +22[V], and the gate low voltage (VGL) may be supplied as a voltage of −20[V].

When the electrophoresis display device is powered on, the power source circuit 500 generates a plurality of driving voltages Vcc, Vcom, Vpos, Vneg, GVDD and GVEE necessary for driving of the display panel 100, data driving circuit 200, and gate driving circuit 300 according to a power-on sequence, by using a DC-DC converter.

The generated driving voltages Vcc, Vcom, Vpos, Vneg, GVDD and GVEE are supplied to the display panel 100, the data driving circuit 200, and the gate driving circuit 300. In this case, the power-on sequence may be preset in the controller 400 or an external host system.

When an input voltage Vin is applied to the power source circuit 500, the power source circuit 500 generates the driving voltages Vcc, Vcom, Vpos, Vneg, GVDD and GVEE, in response to respective enable signals thereof that are inputted from the controller 400 or the host system.

Herein, the logic source voltage Vcc is a logic voltage necessary for driving an Application Specific Integrated Circuit (ASIC) of the controller 400, a source driver Integrated Circuit (IC) of the data driving circuit 200, and a gate driver IC of the gate driving circuit 300, and may be generated as a Direct Current (DC) voltage of about 3.3 V.

The positive data voltage Vpos is generated as a DC voltage of about +15[V], and the negative data voltage Vneg is generated as a DC voltage of about −15[V].

The common voltage is generated as a DC voltage of from 0[V] to −2[V] or from −2[V] to 0[V].

The gate low voltage (VGL) is generated as a DC voltage of −20[V], and the gate high voltage (VGH) is generated as a DC voltage of +22[V].

Herein, when a thin film transistor TFT of a pixel is normally driven by the scan pulse (gate-on signal), a data voltage is charged into the pixel. At this point, the data voltage is not leaked, and moreover, in order to normally drive the pixel, a DC voltage of about +22[V] is supplied as a gate high voltage (VGH) and a DC voltage of about −20[V] is supplied as a gate low voltage (VGL).

When an image displayed on the display panel 100 is converted from a previous screen to a screen next thereto, the data driving circuit 200 supplies data voltages based on waveforms to the pixels through the data lines 120, respectively.

In this case, since a screen conversion is not fast performed due to the bistability characteristics of the pixels, by respectively supplying data voltages based on waveforms for the screen conversion to the pixels, a conversion from a previous screen to a screen next thereto is performed.

An image displayed on the display panel 100 is stabilized by maintaining the idle period for a certain time after image data are updated with waveforms. At this point, the gate driving circuit 300 supplies a stabilization voltage of about −20[V] to the gate lines 110, for stabilization of an image.

Herein, damage can occur due to static electricity that is generated in the display panel 100 or inputted from the outside. To prevent damage due to the static electricity, a plurality of ESD circuits 160 are provided at the respective start portions of the data lines 120. Also, a plurality of ESD circuits 160 are provided at the respective start portions of the gate lines 110, and a plurality of ESD circuits 160 are provided at the respective end portions of the gate lines 110.

The ESD circuits 160 are for discharging static electricity, and provided in respective active areas of the display panel 100. The ESD circuits 160 protect the display panel 100 and the driving circuits from the static electricity.

The electrophoresis display device is driven, and after the power-on period and the update period are performed, the stabilization voltage of about −20[V] is supplied to the gate lines 10 for a certain time for stabilization of an image during the idle period.

In the electrophoresis display device according to an embodiment of the present invention, the ESD circuits 160 respectively connected to the gate lines 110 are connected to a VGL terminal 150, for preventing a leakage current from occurring due to the stabilization voltage of about −20[V] that is supplied for stabilization of an image during the idle period.

Specifically, the first ESD circuits of the ESD circuits 160 are respectively connected to the start portions of the gate lines 110 at one side of the first ESD circuits, and the other sides of the first ESD circuits are connected to the gate low voltage (VGL) terminal 150.

The second ESD circuits of the ESD circuits 160 are respectively connected to the end portions of the gate lines 110 at one side of the second ESD circuits, and the other sides of the second ESD circuits are connected to each other in common, thereby preventing static electricity from being applied to the gate lines 110.

The third ESD circuits of the ESD circuits 160 are respectively connected to the end portions of the data lines 120 at one side of the third ESD circuits, and the other sides of the third ESD circuits are connected to a ground (GND) 140, thereby preventing static electricity from being applied to the data lines 120.

Herein, the ESD circuits 160 respectively connected to the gate lines 110 receive a driving voltage from the gate driving circuit 300 and are thereby driven. The ESD circuits 160 respectively connected to the gate lines 110 receive a driving voltage from the data driving circuit 200 and are thereby driven.

In the related art, when the stabilization voltage of −20[V] is supplied during the idle period, a plurality of ESD circuits are connected to a ground (GND), and thus, an electric potential difference occurs between the ground (GND) and the stabilization voltage of −20[V].

Due to this reason, a leakage current occurs in the related art. However, in the present embodiment, the first ESD circuits and second ESD circuits respectively connected to the gate lines 110 are connected to the VGL terminal 150, and thus, even when the stabilization voltage of about −20[V] is supplied to the gate lines 110, an electric potential difference does not occur on each gate line.

That is, the VGL voltage is supplied to the ESD circuits respectively connected to the gate lines 110, and thus, even when the stabilization voltage of about −20[V] is supplied to the gate lines 110 in the idle period, an electric potential difference does not occur on each of the gate lines 110. Accordingly, a leakage current does not occur even when the stabilization voltage of about −20[V] is supplied to the gate lines 110 in the idle period.

Moreover, a ground (GND) voltage is supplied to the data lines 120 in the idle period. At this point, the data lines 120 are connected to the ground terminal 140, and thus, an equivalent potential is formed on the data lines 120 in the idle period. Therefore, a leakage current does not occur on a path between each of the data lines 120 and the data driver.

The first ESD circuits and second ESD circuits respectively connected to the gate lines 110 are not connected to the third ESD circuits that are respectively connected to the data lines 120. Therefore, due to the stabilization of −20[V] supplied to the gate lines 110, a leakage current does not occur on a path between each of the data lines 120 and the data driver circuit 200.

The stabilization voltage, which is supplied to the gate lines in the idle period, becomes an equivalent potential. The gate low voltage (VGL), which is supplied from the VGL terminal 150 to the first ESD circuits in the idle period, becomes an equivalent potential.

An equipotential voltage is supplied to the data lines 120 and the third ESD circuits in the idle period. Accordingly, the generation of a leakage current is prevented in the idle period, and thus, consumption power can be reduced.

In the present embodiment, the effects of the decrease in consumption power are shown as an example in FIG. 7. Hereinafter, in the present embodiment, the effects of the decrease in consumption power will be described with reference to FIG. 7.

In the related art electrophoresis display device, when a display panel displays a text pattern, a consumption current of about 9.9 uAh occurs due to a leakage current that occurs in an idle period.

On the contrary, in the electrophoresis display device according to an embodiment of the present invention, when the display panel 100 displays a text pattern, a consumption current of about 1.1 uAh occurs by preventing a leakage current from occurring in the idle period.

Accordingly, it can be seen that only about 11.1% of the consumption current of the related art electrophoresis display device occurs in the electrophoresis display device according to an embodiment of the present invention, and thus, consumption current is reduced in the present embodiment.

Herein, the text pattern denotes that a text image is displayed on the display panel.

Furthermore, in the related art electrophoresis display device, when the display panel displays a max pattern, a consumption current of about 12.3 uAh occurs due to a leakage current that occurs in the idle period.

On the contrary, in the electrophoresis display device according to an embodiment of the present invention, when the display panel 100 displays a text pattern, a consumption current of about 1.0 uAh occurs by preventing a leakage current from occurring in the idle period.

Accordingly, it can be seen that only about 8.1% of the consumption current of the related art electrophoresis display device occurs in the electrophoresis display device according to an embodiment of the present invention, and thus, consumption current is reduced in the present embodiment.

Herein, the max pattern denotes that a white image is displayed by odd-line pixels with respect to the gate lines 110 among the total pixels of the display panel, and a black image is displayed by even-line pixels.

Furthermore, in the related art electrophoresis display device, when the display panel displays a grayscale pattern, a consumption current of about 10.7 uAh occurs due to a leakage current that occurs in the idle period.

On the contrary, in the electrophoresis display device according to an embodiment of the present invention, when the display panel 100 displays a grayscale pattern, a consumption current of about 1.0 uAh occurs by preventing a leakage current from occurring in the idle period.

Accordingly, it can be seen that only about 9.3% of the consumption current of the related art electrophoresis display device occurs in the electrophoresis display device according to an embodiment of the present invention, and thus, consumption current is reduced in the present embodiment.

Herein, the grayscale pattern denotes that a bar-type image is displayed in units of four grayscale levels, and indicates a result that is obtained by measuring consumption current when the load of the display panel 110 is in a normal state.

As described above, the electrophoresis display device and the driving method thereof according to an embodiment of the present invention maintain the electrostatic prevention performance of the ESD circuits 160 as-is and prevent a leakage current from occurring due to the stabilization voltage of −20[V] that is supplied to the gate lines 110 in the idle period, thus decreasing consumption power.

According to the embodiments of the present invention, the electrophoresis display device and the driving method thereof can reduce the leakage current caused by the stabilization voltage that is supplied to the gate lines for stabilization of an image during the idle period.

Moreover, the electrophoresis display device and the driving method thereof can reduce the leakage current that is generated during the idle period, thus decreasing consumption power.

In addition to the aforesaid features and effects of the present invention, other features and effects of the present invention can be newly construed from the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electrophoresis display device including a plurality of electrophoresis cells, the electrophoresis display device comprising:

a plurality of gate lines and data lines formed to intersect each other;

a gate driving circuit supplying a scan pulse to the gate lines;

a data driving circuit supplying a plurality of data voltages to the data lines, respectively;

a plurality of first ESD (electrostatic discharge) circuits connected to one sides of the gate lines, respectively;

a plurality of second ESD circuits connected to the other sides of the gate lines, respectively; and a plurality of third ESD circuits respectively connected to the data lines, wherein first terminals of the first ESD circuits are respectively connected to the gate lines, and second terminals of the first ESD circuits are connected to a gate low voltage (VGL) terminal of the gate driving circuit, wherein first terminals of the second ESD circuits are respectively connected to the gate lines, and second terminals of the second ESD circuits are connected to each other in common, and first terminals of the third ESD circuits are respectively connected to the data lines, and second terminals of the third ESD circuits are connected to ground, and wherein the first ESD circuits and second ESD circuits respectively connected to the gate lines are electrically disconnected with the third ESD circuits.

2. The electrophesis display device of claim 1, wherein, the gate driving circuit supplies a gate high voltage to the gate lines in a data update period, and the gate driving circuit supplies a stabilization voltage for stabilizing an image to the gate lines, in an idle period.

3. The electrophesis display device of claim 2, wherein, the stabilization voltage, which is supplied to the gate lines in the idle period, is an equivalent potential, and a gate low voltage, which is supplied from the gate low voltage terminal to the first ESD circuits, is an equivalent potential.

4. The electrophesis display device of claim 3, wherein, the data driving circuit respectively supplies the data voltages to the data lines in the data update period, and the data driving circuit supplies a ground voltage to the data lines, in the idle period.

5. The electrophesis display device of claim 4, wherein in the idle period, an equipotential voltage is supplied to the data lines and the third ESD circuits.

6. The electrophesis display device of claim 1, wherein, an electrophesis film, in which negative charged particles, positive charged particles, and a solvent are capsulized, is disposed between a pixel electrode and a common electrode, thereby forming each of the electrophesis cells, or negative charged particles, positive charged particles, and a solvent are internalized into a filling space defined by a plurality of partition walls which are formed to surround a pixel electrode, thereby forming each of the electrophesis cells.

7. A driving method of an electrophesis display device, which includes: a plurality of gate lines and data lines formed to intersect each other; a gate driving circuit supplying a scan pulse to the gate lines; a data driving circuit supplying a plurality of data voltages to the data lines, respectively; a plurality of first ESD (electrostatic discharge) circuits connected to one sides of the gate lines, respectively; a plurality of second ESD circuits connected to the other sides of the gate lines, respectively; and a plurality of third ESD circuits respectively connected to the data lines, the driving method comprising:

supplying a gate high voltage to the gate lines, and respectively supplying the data voltages to the data lines, in a data update period; and supplying a stabilization voltage for stabilizing an image to the gate lines, and supplying a ground voltage to the data lines, in an idle period, wherein first terminals of the first ESD circuits are respectively connected to the gate lines, and second terminals of the first ESD circuits are connected to a gate low voltage (VGL) terminal of the gate driving circuit, wherein first terminals of the second ESD circuits are respectively connected to the gate lines, and second terminals of the second ESD circuits are connected to each other in common, and first terminals of the third ESD circuits are respectively connected to the data lines, and second terminals of the third ESD circuits are connected to ground, and wherein the first ESD circuits and second ESD circuits respectively connected to the gate lines are electrically disconnected with the third ESD circuits.

8. The driving method of claim 7, wherein, the stabilization voltage, which is supplied to the gate lines in the idle period, is an equivalent potential, and a gate low voltage, which is supplied from the gate low voltage terminal to the first ESD circuits, is an equivalent potential.

9. The driving method of claim 8, wherein in the idle period, an equipotential voltage is supplied to the data lines and the third ESD circuits.

* * * * *